US012673534B2

(12) United States Patent
Jeong et al.

(10) Patent No.: US 12,673,534 B2
(45) Date of Patent: Jul. 7, 2026

(54) THERMAL MANAGEMENT SYSTEM FOR A VEHICLE

(71) Applicants: HYUNDAI MOTOR COMPANY, Seoul (KR); KIA CORPORATION, Seoul (KR)

(72) Inventors: Seong-Bin Jeong, Seongnam-si (KR); Yong Woong Cha, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 96 days.

(21) Appl. No.: 18/656,254

(22) Filed: May 6, 2024

(65) Prior Publication Data

US 2025/0144975 A1 May 8, 2025

(30) Foreign Application Priority Data

Nov. 6, 2023 (KR) ........................ 10-2023-0151701

(51) Int. Cl.
| | |
|---|---|
| *B60H 1/14* | (2006.01) |
| *B60H 1/00* | (2006.01) |
| *B60K 11/04* | (2006.01) |
| *B60L 58/26* | (2019.01) |
| *B60L 58/27* | (2019.01) |

(52) U.S. Cl.
CPC ......... *B60H 1/143* (2013.01); *B60H 1/00278* (2013.01); *B60H 1/00885* (2013.01); *B60K 11/04* (2013.01); *B60L 58/26* (2019.02); *B60L*

*58/27* (2019.02); *B60H 2001/00307* (2013.01); *B60H 2001/00928* (2013.01)

(58) Field of Classification Search
CPC B60H 1/143; B60H 1/00278; B60H 1/00885; B60H 2001/00307; B60H 2001/00928; B60L 58/27; B60L 58/26; B60K 11/04
See application file for complete search history.

(56) References Cited

U.S. PATENT DOCUMENTS

| | | | | | |
|---|---|---|---|---|---|
| 6,481,230 | B2 * | 11/2002 | Kimishima | ............. | B60L 53/11 |
| | | | | | 62/238.7 |
| 6,569,550 | B2 * | 5/2003 | Khelifa | .................. | B60H 1/323 |
| | | | | | 429/434 |
| 6,616,059 | B2 * | 9/2003 | Sabhapathy | .......... | B60W 10/30 |
| | | | | | 237/12.3 B |
| 7,520,320 | B2 * | 4/2009 | Itoh | ......................... | B60L 58/33 |
| | | | | | 62/238.7 |

(Continued)

*Primary Examiner* — Travis Ruby
(74) *Attorney, Agent, or Firm* — Lempia Summerfield Katz LLC

(57) ABSTRACT

A thermal management system for a vehicle includes: a first valve module configured to control flow of a coolant that is interiorly introduced according to at least one mode for a temperature adjustment of a vehicle interior, a temperature adjustment of an electrical component, and a temperature adjustment of a battery module; and a second valve module selectively connected to the first valve module through at least one line, and configured to control flow of the interiorly introduced coolant according to the at least one mode, where the at least one line selectively connects a radiator, the electrical component, the battery module, a chiller, a battery heater, and a cabin heater to the first valve module or the second valve module.

17 Claims, 6 Drawing Sheets

(56) References Cited

U.S. PATENT DOCUMENTS

| | | | | |
|---|---|---|---|---|
| 8,336,319 B2 * | 12/2012 | Johnston | ................ | B60K 11/04 |
| | | | | 62/434 |
| 9,511,645 B2 * | 12/2016 | Johnston | ............ | B60H 1/32284 |
| 9,631,872 B2 * | 4/2017 | Lombardo | ......... | B60H 1/00385 |
| 10,046,617 B2 * | 8/2018 | Smith | ................ | B60H 1/00392 |
| 2005/0000473 A1 * | 1/2005 | Ap | ......................... | F01P 7/165 |
| | | | | 123/41.31 |
| 2008/0251235 A1 * | 10/2008 | Zhou | ...................... | B60L 58/26 |
| | | | | 165/59 |
| 2009/0020620 A1 * | 1/2009 | Douarre | ................ | B60H 1/039 |
| | | | | 237/12.3 R |
| 2013/0175022 A1 * | 7/2013 | King | ...................... | B60L 50/62 |
| | | | | 237/12.3 B |
| 2014/0114516 A1 * | 4/2014 | Badger | ............. | B60H 1/00385 |
| | | | | 903/903 |
| 2016/0318370 A1 * | 11/2016 | Rawlinson | ......... | B60H 1/32281 |

* cited by examiner

THERMAL MANAGEMENT SYSTEM FOR A VEHICLE

CROSS-REFERENCE TO RELATED APPLICATION

This application claims priority to Korean Patent Application No. 10-2023-0151701 filed in the Korean Intellectual Property Office on Nov. 6, 2023, the entire contents of which is incorporated herein by reference.

BACKGROUND OF THE DISCLOSURE

(a) Field of the Disclosure

The present disclosure relates to a thermal management system for a vehicle. More particularly, the present disclosure relates to a thermal management system for a vehicle capable of adjusting the temperature of a battery module by using one chiller where the refrigerant and the coolant heat-exchange with each other and a battery heater for selectively heating the coolant, and performing heating of the vehicle interior by using the coolant heated by the battery heater.

(b) Description of the Related Art

In recent years, an electric vehicle has become popular as a future transporting means, as the environment and energy resources are becoming important issues. The electric vehicle uses a battery module in which a plurality of rechargeable cells are formed as one pack as a main power source, and thus no exhaust gas is generated and noise is very low.

Such an electric vehicle is driven by a driving motor which operates through electric power supplied from the battery module. In addition, the electric vehicle includes electrical components for controlling and managing the driving motor as well as a plurality of electronic convenience devices and charging the battery module.

Since a large amount of heat is generated in the battery module and the driving motor used as a primary power source of the electric vehicle, as well as the electrical components, efficient cooling is required, so efficient temperature management of the electrical components and the battery module may be a very important problem.

In addition, since a battery module performs optimally at a preset temperature, it needs to be rapidly heated to the preset temperature in the early stage of driving.

Conventionally, separate cooling systems are applied to adjust the temperature of the electrical components and the battery module, but it is necessary to increase capacity of the cooling system according thereto, which leads to space restrictions. Further, when the capacity of the cooling systems is increased, power required for operating the cooling systems is also increased.

Accordingly, it is required to develop technologies for efficiently using waste heat generated from the electrical components, as well as adjusting the temperature of the electrical components and the battery in order to maximize the energy efficiency while securing the durability of the electrical components and the battery module in the electric vehicle.

In addition, when a heat pump system is not applied, there is a need to develop technology to heat the vehicle interior using coolant.

The above information disclosed in this Background section is only for enhancement of understanding of the background of the disclosure, and therefore it may contain information that does not form the prior art that is already known in this country to those having ordinary skill in the art.

SUMMARY

The present disclosure attempts to provide a thermal management system for a vehicle capable of adjusting the temperature of a battery module by using one chiller where the refrigerant and the coolant heat-exchange with each other and a battery heater for selectively heating the coolant, and performing heating of the vehicle interior by using the coolant heated by the battery heater.

In addition, the present disclosure attempts to provide a thermal management system for a vehicle capable of simplifying a layout of the system and reducing manufacturing costs by forming a plurality of coolant flowing lines by two valves according to a selected mode of the vehicle.

A thermal management system for a vehicle may include a first valve module configured to control flow of a coolant that is interiorly introduced according to at least one mode for a temperature adjustment of a vehicle interior, a temperature adjustment of an electrical component, and a temperature adjustment of a battery module. The thermal management system may also include a second valve module selectively connected to the first valve module through at least one line, and configured to control flow of the interiorly introduced coolant according to the at least one mode. The at least one line selectively connects a radiator, the electrical component, the battery module, a chiller, a battery heater, and a cabin heater to the first valve module or the second valve module.

The at least one line may include: a first line having a first end connected to the first valve module to selectively allow flow of the coolant, and a second end connected to the radiator; a second line having a first end connected to the radiator and a second end connected to the first valve module to selectively allow flow of the coolant; a third line having a first end connected to the first valve module to selectively allow flow of the coolant, and a second end connected to the electrical component; a fourth line having a first end connected to the electrical component and a second end connected to the first valve module to selectively allow flow of the coolant; a fifth line having a first end connected to the first valve module and a second end connected to the battery heater to selectively allow flow of the coolant; a sixth line having a first end connected to the first valve module and a second end connected to the second valve module to selectively allow flow of the coolant; a seventh line having a first end connected to the second valve module to selectively allow flow of the coolant and a second end connected to the chiller, and provided with the battery module; an eighth line having a first end connected to the chiller and a second end connected to the second valve module, to selectively allow flow of the coolant; a ninth line having a first end connected to the second valve module to selectively allow flow of the coolant, and a second end connected to the battery heater; a tenth line having a first end connected to the second valve module to selectively allow flow of the coolant, and a second end connected to the cabin heater; and an eleventh line having a first end connected to the cabin heater and a second end connected to the second valve module, to selectively allow flow of the coolant.

The first valve module may include a first valve configured to control flow of the interiorly introduced coolant, and a first water pump provided in the first valve.

The first valve may be configured to selectively discharge the coolant selectively introduced from the second line, the fourth line, or the sixth line, through the first line, the third line, or the fifth line, depending on a selected mode among the at least one mode.

Depending on the selected mode, the first valve may selectively discharge the coolant selectively introduced from the second line, the fourth line, or the sixth line through the first line, the third line, or the fifth line.

The first water pump may be mounted in the first valve to correspond to the third line.

The second valve module may include a second valve configured to control flow of the interiorly introduced coolant, and a second water pump provided in the second valve.

The second valve may be configured to selectively discharge the coolant selectively introduced from the eighth line, the ninth line, or the eleventh line through the sixth line, the seventh line, or the tenth line.

The second water pump may be mounted in the second valve to correspond to the seventh line.

The at least one mode may include a first mode for cooling the electrical component and cooling the battery module; a second mode for heating the vehicle interior and cooling the battery module; a third mode for increasing a temperature of the battery module; a fourth mode for heating the vehicle interior and increasing the temperature of the battery module; and a fifth mode for cooling the battery module by using the coolant cooled at the radiator.

In the first mode, the second line may be connected to the third line by an operation of the first valve module, and the fourth line may be connected to the first line by the operation of the first valve module such that the coolant cooled at the radiator may be supplied to the electrical component. The first line, the second line, the third line, and the fourth line may be interconnected by the operation of the first valve module so as to form an independent closed circuit through which the coolant circulates. The eighth line may be connected to the seventh line by an operation of the second valve module to form an independent closed circuit through which the coolant circulates such that the coolant cooled at the chiller may be supplied to the battery module. The fifth line and the sixth line may be closed by the operation of the first valve module. The ninth line, the tenth line, and the eleventh line may be closed by the operation of the second valve module.

In the second mode, the first line and the second line may be closed by an operation of the first valve module. The third line may be connected to the sixth line by the operation of the first valve module. The fourth line may be connected to the fifth line by the operation of the first valve module. The eighth line may be connected to the seventh line by an operation of the second valve module to form an independent closed circuit through which the coolant circulates such that the coolant cooled at the chiller may be supplied to the battery module. The ninth line may be connected to the tenth line by the operation of the second valve module such that the coolant heated at the battery heater may be supplied to the cabin heater. The eleventh line may be connected to the sixth line by the operation of the second valve module. The third line, the fourth line, the fifth line, the sixth line, the ninth line, the tenth line, and the eleventh line may be interconnected to the first valve module through the second valve module, so as to form an independent closed circuit through which the coolant circulates.

In the third mode, the second line may be connected to the third line by an operation of the first valve module, and the fourth line may be connected to the first line by the operation of the first valve module such that the coolant cooled at the radiator may be supplied to the electrical component. The first line, the second line, the third line, and the fourth line may be interconnected by the operation of the first valve module so as to form an independent closed circuit through which the coolant circulates. The sixth line may be connected to the fifth line by the operation of the first valve module. The ninth line may be connected to the seventh line by an operation of the second valve module such that the coolant heated at the battery heater may be supplied to the battery module. The eighth line may be connected to the sixth line by the operation of the second valve module. The tenth line and the eleventh line may be closed by the operation of the second valve module. The fifth line, the sixth line, the seventh line, the eighth line, and the ninth line may be interconnected by the operation of the first valve module and the second valve module, so as to form an independent closed circuit through which the coolant circulates.

In the fourth mode, the first line and the second line may be closed by an operation of the first valve module. The third line may be connected to the sixth line by the operation of the first valve module The fourth line may be connected to the fifth line by the operation of the first valve module. The ninth line may be connected to the tenth line by an operation of the second valve module such that the coolant heated at the battery heater may be supplied to the battery module and the cabin heater. The eleventh line may be connected to the seventh line by the operation of the second valve module. The eighth line may be connected to the sixth line by the operation of the second valve module. The coolant heated while passing through the battery heater may pass through the cabin heater along the tenth line connected to the ninth line through the second valve module, and then may pass through the battery module along the eleventh line and the seventh line connected by the second valve module.

In the fifth mode, the second line may be connected to the fifth line by an operation of the first valve module such that the coolant cooled at the radiator may be supplied to the battery module. The sixth line may be connected to the first line by the operation of the first valve module. The third line and the fourth line may be closed by the operation of the first valve module. The eighth line may be connected to the sixth line by an operation of the second valve module. The ninth line may be connected to the seventh line by the operation of the second valve module. The tenth line and the eleventh line may be closed by the operation of the second valve module. The first line, the second line, the fifth line, the sixth line, the seventh line, the eighth line, and the ninth line may be interconnected by the operation of the first valve module and the second valve module, so as to form an independent closed circuit through which the coolant circulates.

The chiller may be connected to an air conditioner unit through a refrigerant connection line.

The chiller may be a water-cooled heat-exchanger configured to heat-exchange the interiorly introduced coolant with the refrigerant supplied from the air conditioner unit.

For cooling the battery module by using the coolant heat-exchanged at the chiller, the air conditioner unit may be configured to supply a refrigerant of low-temperature to the chiller through the refrigerant connection line.

As described above, according to a thermal management system for a vehicle according to an embodiment, by adjusting the temperature of the battery module by using a battery heater and one chiller where the refrigerant and the coolant are heat-exchanged, and performing heating of the vehicle interior by using the coolant heated by the battery heater, the overall efficiency of the system may be improved.

In addition, according to the present disclosure, by forming a plurality of coolant flowing lines by a single valve according to selected modes of the vehicle, streamlining and simplification of the system may be achieved, and the manufacturing costs may be reduced by removing a positive temperature coefficient (PTC) heater.

In addition, according to an embodiment, by efficiently adjusting the temperature of the battery module, the optimal performance of the battery module may be enabled, and the overall travel distance of the vehicle may be increased due to the efficient management of the battery module.

In addition, according to an embodiment, it is possible to reduce manufacturing cost and weight through simplification of an entire system, and to improve space utilization.

DETAILED DESCRIPTION

Figure 1:
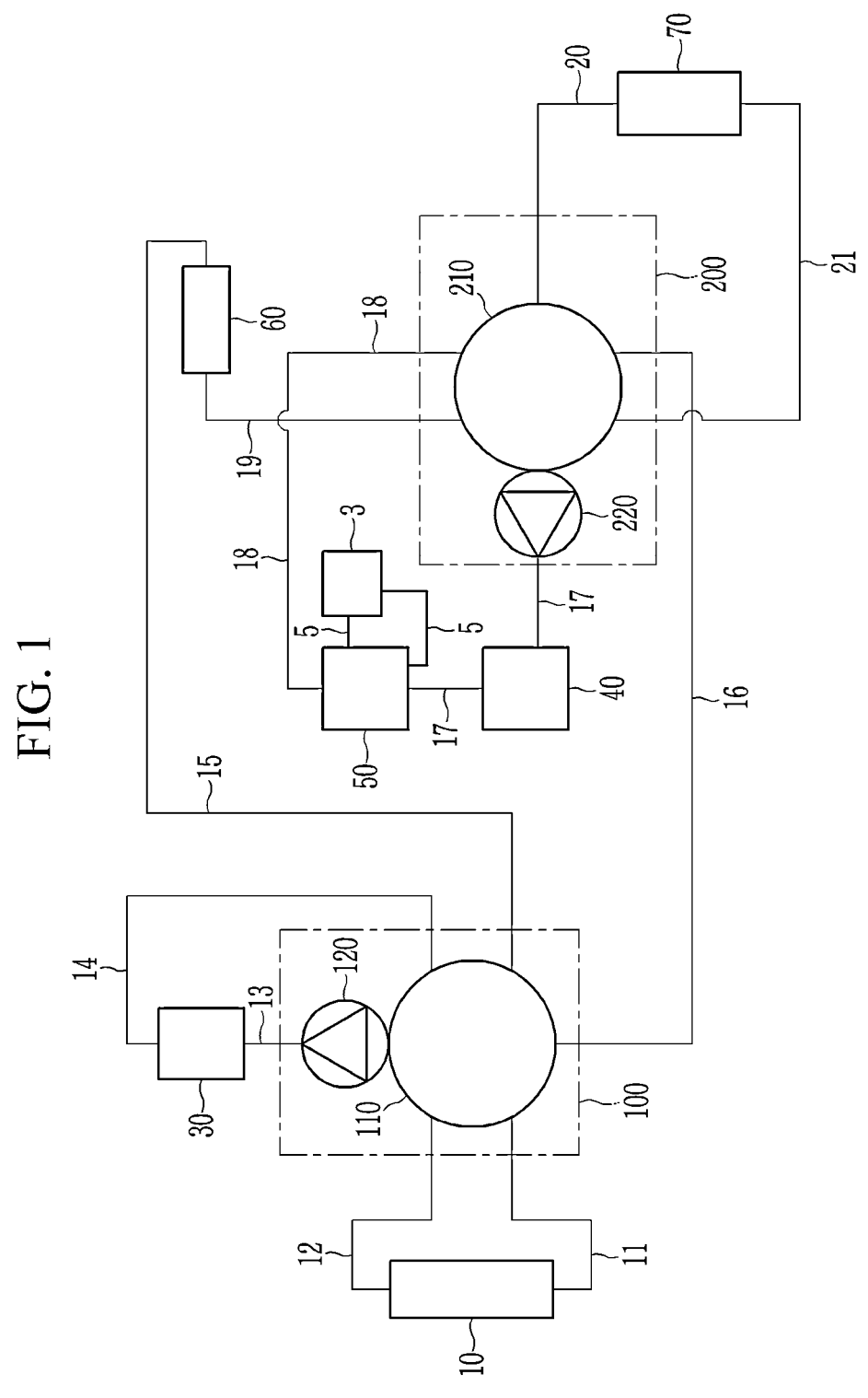
FIG. 1 is a block diagram of a thermal management system for a vehicle according to an embodiment.

An embodiment is described in detail below with reference to the accompanying drawings.

Embodiments disclosed in the present specification and the constructions depicted in the drawings are only example embodiments of the present disclosure, and do not cover the entire scope of the present disclosure. Therefore, it is understood that there may be various equivalents and variations at the time of the application of this specification.

In order to clarify the present disclosure, parts that are not related to the description are omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

In addition, unless explicitly described to the contrary, the word "comprise" and variations such as "comprises" or "comprising", is understood to imply the inclusion of stated elements but not the exclusion of any other elements.

Furthermore, each of terms, such as " . . . unit", " . . . means", " . . . portions", " . . . part", and " . . . member" described in the specification, mean a unit of a comprehensive element that performs at least one function or operation.

FIG. 1 is a block diagram of a thermal management system of a vehicle according to an embodiment.

A thermal management system for a vehicle according to an embodiment may efficiently adjust a temperature of a battery module 40, and perform heating of a vehicle interior by using the coolant heated at the battery heater 60, by using one chiller 50 where a refrigerant and a coolant are heat-exchanged with each other and a battery heater 60 is selectively heating the coolant.

In addition, according to the disclosed thermal management system, the layout of the system may be simplified and the manufacturing costs may be reduced, by forming a plurality of coolant lines by two valves according to a selected mode of the vehicle.

According to the thermal management system disclosed herein, in an electric vehicle, the battery module 40 through which the coolant circulates may be interconnected with an air conditioner unit 3 circulating the refrigerant in order to cool the vehicle interior through the chiller 50.

In other words, referring to FIG. 1, the thermal management system may include at least one line through which the coolant flows, a first valve module 100, and a second valve module 200.

First, the first valve module 100 may control flow of the interiorly introduced coolant according to at least one selected mode for a temperature adjustment of the vehicle interior, temperature adjustment of an electrical component 30, and a temperature adjustment of the battery module 40.

The second valve module 200 may be selectively connected to the first valve module 100 through the at least one line, and may control flow of the interiorly introduced coolant depending on the at least one selected mode.

A configuration of the first valve module 100 and the second valve module 200 is described in more detail below.

In the present embodiment, at least one line may selectively connect a radiator 10, the electrical component 30, the battery module 40, the chiller 50, the battery heater 60, and a cabin heater 70 to the first valve module 100 or the second valve module 200.

The at least one line may include a first line 11, a second line 12, a third line 13, a fourth line 14, a fifth line 15, a sixth line 16, a seventh line 17, an eighth line 18, a ninth line 19, a tenth line 20, and an eleventh line 21.

A first end of the first line 11 may be connected to the first valve module 100, and the coolant may selectively flow therethrough. A second end of the first line 11 may be connected to the radiator 10.

The radiator 10 may be disposed in the front of the vehicle, and a cooling fan (not shown) may be provided at a downstream side of the radiator 10. Accordingly, the radiator 10 may cool the coolant through an operation of the cooling fan and heat-exchange with ambient air.

A first end of the second line 12 may be connected to the radiator 10. A second end of the second line 12 may be connected to the first valve module 100, and the coolant may selectively flow therethrough.

In the present embodiment, a first end of the third line 13 may be connected to the first valve module 100, and the coolant may selectively flow therethrough. A second end of the third line 13 may be connected to the electrical component 30.

A first end of the fourth line 14 may be connected to the electrical component 30. A second end of the fourth line 14 may be connected to the first valve module 100, and the coolant may selectively flow therethrough.

Accordingly, the electrical component 30 may be formed as a water-cooled scheme that is cooled by the coolant.

A first end of the fifth line 15 may be connected to the first valve module 100, and the coolant may selectively flow therethrough. A second end of the fifth line 15 may be connected to the battery heater 60.

In the present embodiment, a first end of the sixth line 16 may be connected to the first valve module 100. A second end of the sixth line 16 may be connected to the second valve module 200, and the coolant may selectively flow therethrough.

A first end of the seventh line 17 may be connected to the second valve module 200, and the coolant may selectively flow therethrough. A second end of the seventh line 17 may be connected to the chiller 50.

A first end of the eighth line 18 may be connected to the chiller 50. A second end of the eighth line 18 may be connected to the second valve module 200, and the coolant may selectively flow therethrough.

The chiller 50 may be connected to the air conditioner unit 3 through a refrigerant connection line 5. The chiller 50 may be a water-cooled heat-exchanger that heat-exchanges the interiorly introduced coolant with the refrigerant supplied from the air conditioner unit 3.

For cooling the battery module 40 by using the coolant heat-exchanged at the chiller 50, the air conditioner unit 3 may supply a refrigerant of low-temperature to the chiller 50 through the refrigerant connection line 5.

In other words, the chiller 50 may adjust a temperature of the coolant by heat-exchanging the selectively supplied coolant with the refrigerant selectively supplied from the air conditioner unit 3.

The chiller 50 may be operated when cooling the battery module 40.

In the present embodiment, a first end of the ninth line 19 may be connected to the second valve module 200, and the coolant may selectively flow therethrough. A second end of the ninth line 19 may be connected to the battery heater 60.

A first end of the tenth line 20 may be connected to the second valve module 200, and the coolant may selectively flow therethrough. A second end of the tenth line 20 may be connected to the cabin heater 70.

In addition, a first end of the eleventh line 21 may be connected to the cabin heater 70. A second end of the eleventh line 21 may be connected to the second valve module 200, and the coolant may selectively flow therethrough.

For increasing the temperature of the battery module 40, or for supplying the high-temperature coolant to the cabin heater 70, the battery heater 60 may be operated to heat the coolant.

The battery heater 60 may be an electrical heater operated by supply of power.

In other words, when the temperature of the battery module 40 is to be increased or heating of the vehicle interior is required, the battery heater 60 may heat the coolant supplied through the fifth line 15, and discharge the heated coolant to the ninth line 19.

Accordingly, the coolant whose temperature is increased while passing through the battery heater 60 may be supplied to the cabin heater 70 and the battery module 40 by an operation of the second valve module 200.

Therefore, when the temperature of the battery module 40 is to be increased or the vehicle interior is to be heated, the battery heater 60 may selectively operate.

In addition, in the present embodiment, the cabin heater 70 may be provided inside an HVAC module (not shown). An evaporator provided in the air conditioner unit 3 may be provided together inside the HVAC module.

The first valve module 100 may include a first valve 110 configured to control flow of the interiorly introduced coolant, and a first water pump 120 provided in or on the first valve 110.

The first valve 110 may selectively discharge the coolant selectively introduced from the second line 12, the fourth line 14, or the sixth line 16 through the first line 11, the third line 13, or the fifth line 15, depending on the selected mode among at least one mode.

In addition, the first water pump 120 may be mounted on the first valve 110 to correspond to the third line 13.

In addition, the second valve module 200 may include a second valve 210 configured to control flow of the interiorly introduced coolant, and a second water pump 220 provided in or on the second valve 210.

The second valve 210 may selectively discharge the coolant selectively introduced from the eighth line 18, the ninth line 19, or the eleventh line 21 through the sixth line 16, the seventh line 17, or the tenth line 20.

In addition, the second water pump 220 may be mounted on the second valve 210 to correspond to the seventh line 17.

The at least one mode may include a first mode to a fifth mode.

In the first mode, the electrical component 30 may be cooled, and the battery module 40 may be cooled.

In the second mode, the vehicle interior may be heated and the battery module 40 may be cooled.

In the present embodiment, in the third mode, the temperature of the battery module 40 may be increased.

In the fourth mode, the vehicle interior may be heated, and the temperature of the battery module 40 may be increased.

In addition, in the fifth mode, the battery module 40 may be cooled by using the coolant cooled at the radiator 10.

Hereinafter, an operation and action in each mode of a thermal management system for a vehicle according to an embodiment configured as described above is described in detail with reference to FIG. 2-6.

First, an operation in the first mode of a thermal management system for a vehicle according to an embodiment, which is for cooling the electrical component 30 and cooling the battery module 40, is described in detail with reference to FIG. 2.

Figure 2:
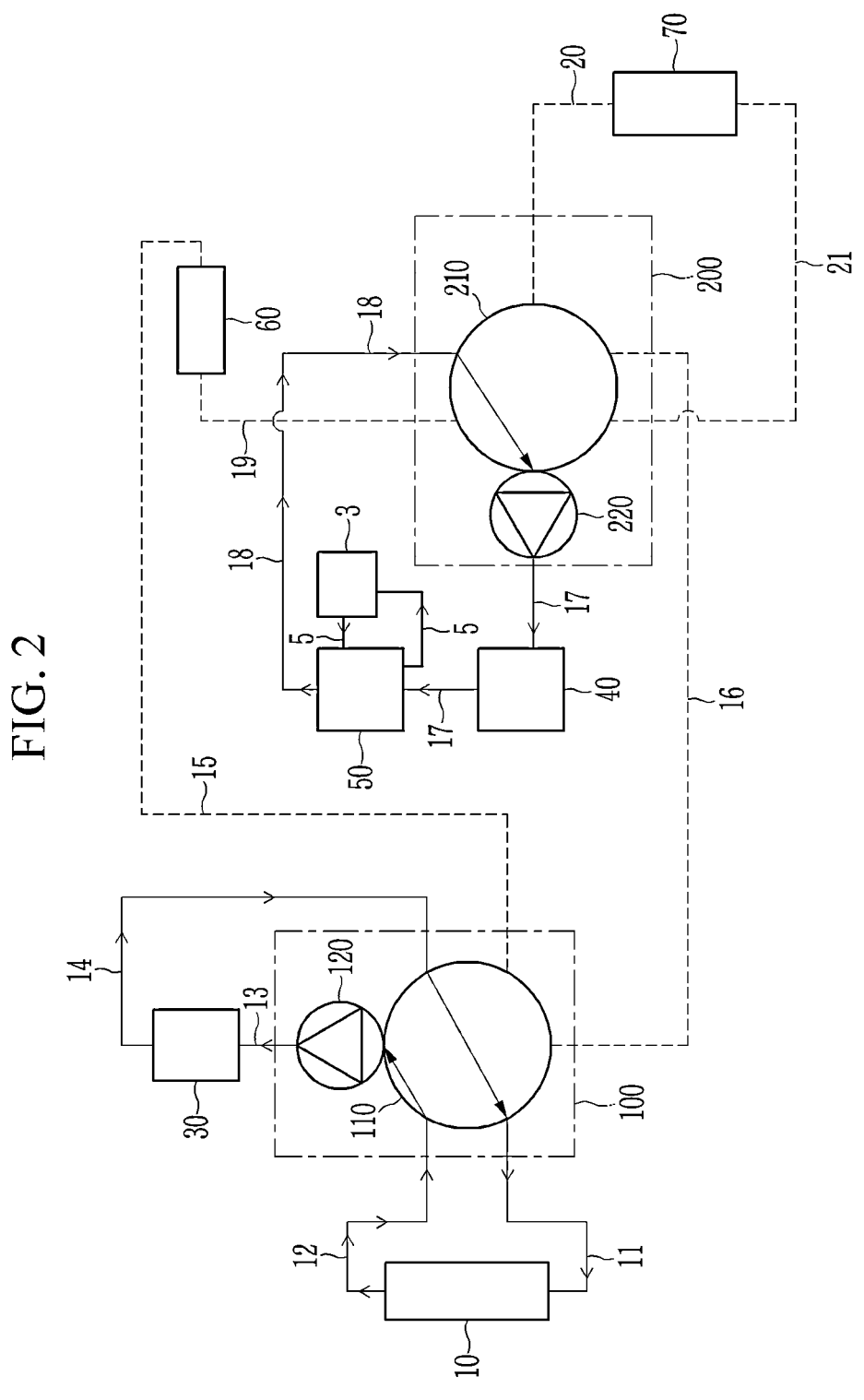
FIG. 2 is an operation diagram according to a first mode of a thermal management system for a vehicle according to an embodiment.

FIG. 2 is an operation diagram according to the first mode of a heat pump system for a vehicle according to an embodiment.

Referring to FIG. 2, in the first mode, the second line 12 may be connected to the third line 13 by an operation of the first valve 110 such that the coolant cooled at the radiator 10 may be supplied to the electrical component 30.

The fourth line 14 may be connected to the first line 11 by the operation of the first valve 110.

The fifth line 15 and the sixth line 16 may be closed by the operation of the first valve 110.

Accordingly, the first line 11, the second line 12, the third line 13, and the fourth line 14 may be interconnected by the operation of the first valve 110, so as to form an independent closed circuit through which the coolant circulates.

In such a state, when the first water pump 120 operates, the coolant discharged from the first valve 110 to the third line 13 may pass through the electrical component 30. Thereafter, the coolant may flow into the first valve 110 along the fourth line 14.

The coolant introduced into the first valve 110 through the fourth line 14 may be discharged to the first line 11 connected by the operation of the first valve 110.

The coolant discharged to the first line 11 may be introduced into the radiator 10. The coolant introduced into the radiator 10 may be cooled through heat-exchange with the ambient air. In addition, the coolant cooled at the radiator 10 may be introduced into the first valve 110 along the second line 12, and then discharged through the third line 13.

Therefore, the coolant cooled while passing through the radiator 10 may flow through the third line 13. Then, the electrical component 30 may be efficiently cooled by the coolant cooled at the radiator 10.

In other words, while repeatedly performing the above-described processes, the coolant cooled at the radiator 10 may cool the electrical component 30 to prevent overheating.

In the present embodiment, the eighth line 18 may be connected to the seventh line 17 by an operation of the second valve 210 to form an independent closed circuit such that the coolant cooled at the chiller 50 may be supplied to the battery module 40.

The air conditioner unit 3 may operate such that the refrigerant may be supplied to the chiller 50 through the refrigerant connection line 5.

Then, the chiller 50 may cool the introduced coolant through heat-exchange with the refrigerant such that the low-temperature coolant may be supplied to the battery module 40.

The ninth line 19, the tenth line 20, and the eleventh line 21 may be closed by the operation of the second valve 210.

In such a state, when the second water pump 220 operates, the coolant having passed through the battery module 40 along the seventh line 17 may flow into the chiller 50, and then be discharged through the eighth line 18.

The coolant flowing along the eighth line 18 may flow into the seventh line 17 connected by the operation of the second valve 210.

In other words, when the second water pump 220 operates, the coolant may circulate along the seventh line 17 and the eighth line 18.

The coolant cooled through heat-exchange with the low-temperature refrigerant while passing through the chiller 50 may by introduced into the battery module 40 by an operation of the second valve 210 and the second water pump 220, and accordingly, the battery module 40 may be more efficiently cooled.

In other words, while repeatedly performing the above-described processes, the coolant cooled at the radiator 10 may cool the electrical component 30 to prevent overheating. At the same time, the coolant cooled at the chiller 50 may cool the battery module 40 to prevent overheating.

In the present embodiment, an operation in the second mode for heating the vehicle interior and cooling the battery module 40 is described in detail below with reference to FIG. 3.

Figure 3:
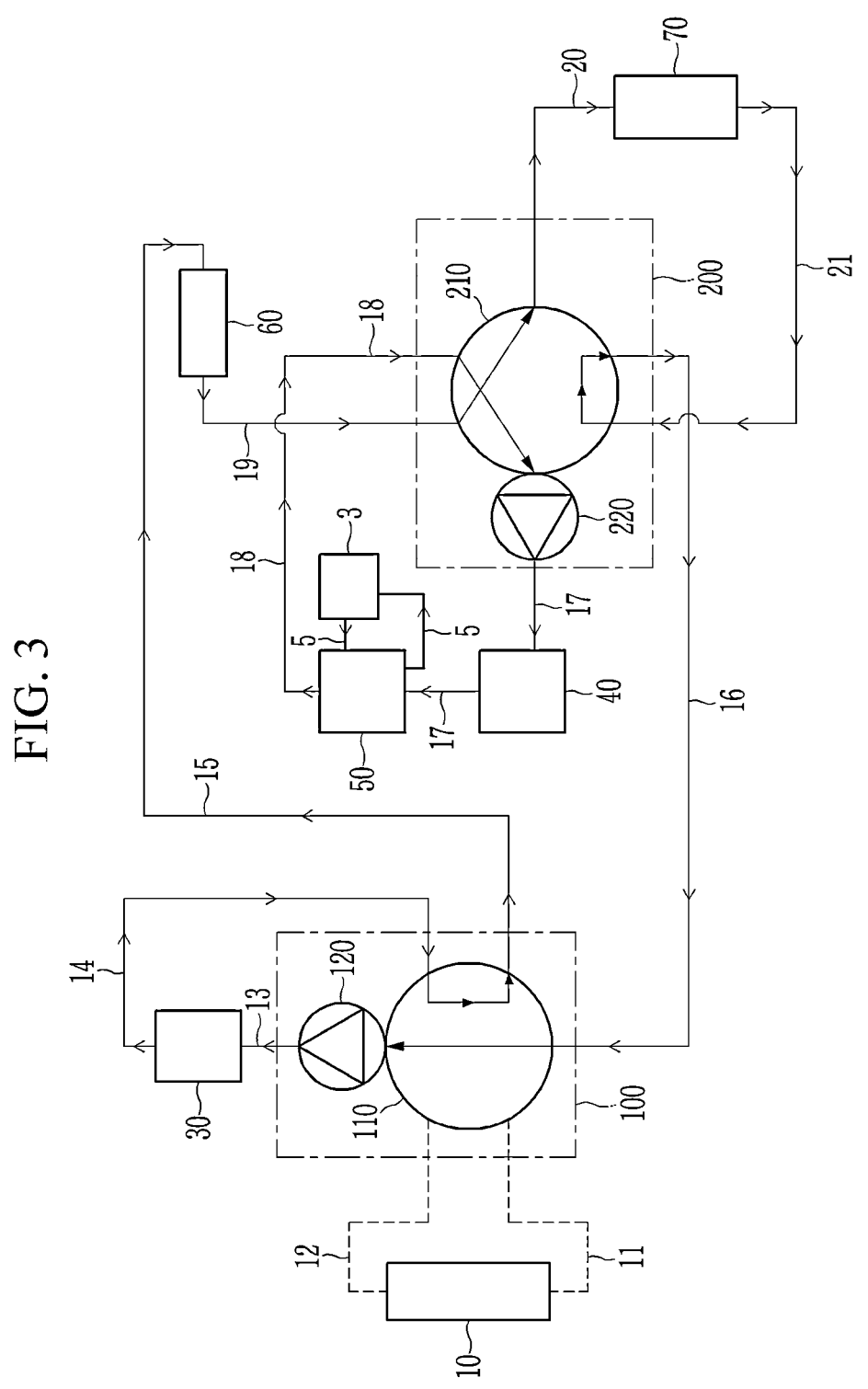
FIG. 3 is an operation diagram according to a second mode of a thermal management system for a vehicle according to an embodiment.

FIG. 3 is an operation diagram according to the second mode of a thermal management system for a vehicle according to an embodiment.

Referring to FIG. 3, in the second mode, the first line 11 and the second line 12 may be closed by the operation of the first valve 110. Accordingly, the coolant may not flow through the radiator 10.

The third line 13 may be connected to the sixth line 16 by the operation of the first valve 110. In addition, the fourth line 14 may be connected to the fifth line 15 by the operation of the first valve 110.

Simultaneously, the eighth line 18 may be connected to the seventh line 17 by the operation of the second valve 210 to form an independent closed circuit such that the coolant cooled at the chiller 50 may be supplied to the battery module 40.

The air conditioner unit 3 may operate such that the refrigerant may be supplied to the chiller 50 through the refrigerant connection line 5.

Then, the chiller 50 may cool the introduced coolant through heat-exchange with the refrigerant such that the low-temperature coolant may be supplied to the battery module 40.

In such a state, when the second water pump 220 operates, the coolant having passed through the battery module 40 along the seventh line 17 may flow into the chiller 50, and then be discharged through the eighth line 18.

The coolant flowing along the eighth line 18 may flow into the seventh line 17 connected by the operation of the second valve 210.

In other words, when the second water pump 220 operates, the coolant may circulate along the seventh line 17 and the eighth line 18.

The coolant cooled through heat-exchange with the low-temperature refrigerant while passing through the chiller 50 may by introduced into the battery module 40 by the operation of the second valve 210 and the second water pump 220, and accordingly, the battery module 40 may be more efficiently cooled.

The ninth line 19 may be connected to the tenth line 20 by the operation of the second valve 210 such that the coolant heated at the battery heater 60 may be supplied to the cabin heater 70.

Simultaneously, the eleventh line 21 may be connected to the sixth line 16 by the operation of the second valve 210.

Accordingly, the third line 13, the fourth line 14, the fifth line 15, the sixth line 16, the ninth line 19, the tenth line 20, and the eleventh line 21 may be interconnected to the first valve 110 through the second valve 210 so as to form an independent closed circuit through which the coolant circulates separately from the interconnected seventh line 17 and eighth line 18.

In such a state, when the first water pump 120 operates, the coolant may flow from the first valve 110 to the third line 13 and may pass through the electrical component 30, and may flow back into the first valve 110 along the fourth line 14.

Then, the coolant may pass through the battery heater 60 along the fifth line 15 connected to the fourth line 14 through the first valve 110.

The battery heater 60 may be operated to increase the temperature of the coolant by heating the introduced coolant. The coolant whose temperature is increased may be introduced into the second valve 210 along the ninth line 19, and then be discharged to the tenth line 20 connected by the second valve 210.

In other words, the coolant heated while passing through the battery heater 60 may be supplied to the cabin heater 70 along the ninth line 19 and the tenth line 20 connected by the operation of the second valve module 200.

Accordingly, the ambient air introduced from the outside may be converted to a high-temperature state while passing through the cabin heater 70 and then introduced into the vehicle interior, thereby implementing heating of the vehicle interior.

The coolant having passed through the cabin heater 70 may flow into the second valve 210 along the eleventh line 21. Thereafter, the coolant may flow along the sixth line 16 connected to the eleventh line 21 through the second valve 210.

The coolant flowing through the sixth line 16 may repeatedly perform the above-described processes while being discharged to the third line 13 connected through the first valve 110.

In other words, while repeatedly performing the above-described processes, the coolant cooled at the chiller 50 may cool the battery module 40 to prevent overheating.

In addition, as the coolant heated while passing through the battery heater 60 is supplied to the cabin heater 70, the ambient air introduced into the HVAC module (not shown) may be converted to a high-temperature state while passing through the cabin heater 70 and then introduced into the vehicle interior, thereby implementing heating of the vehicle interior.

In the present embodiment, an operation according to the third mode for increasing the temperature of the battery module 40 is described in detail below with reference to FIG. 4.

Figure 4:
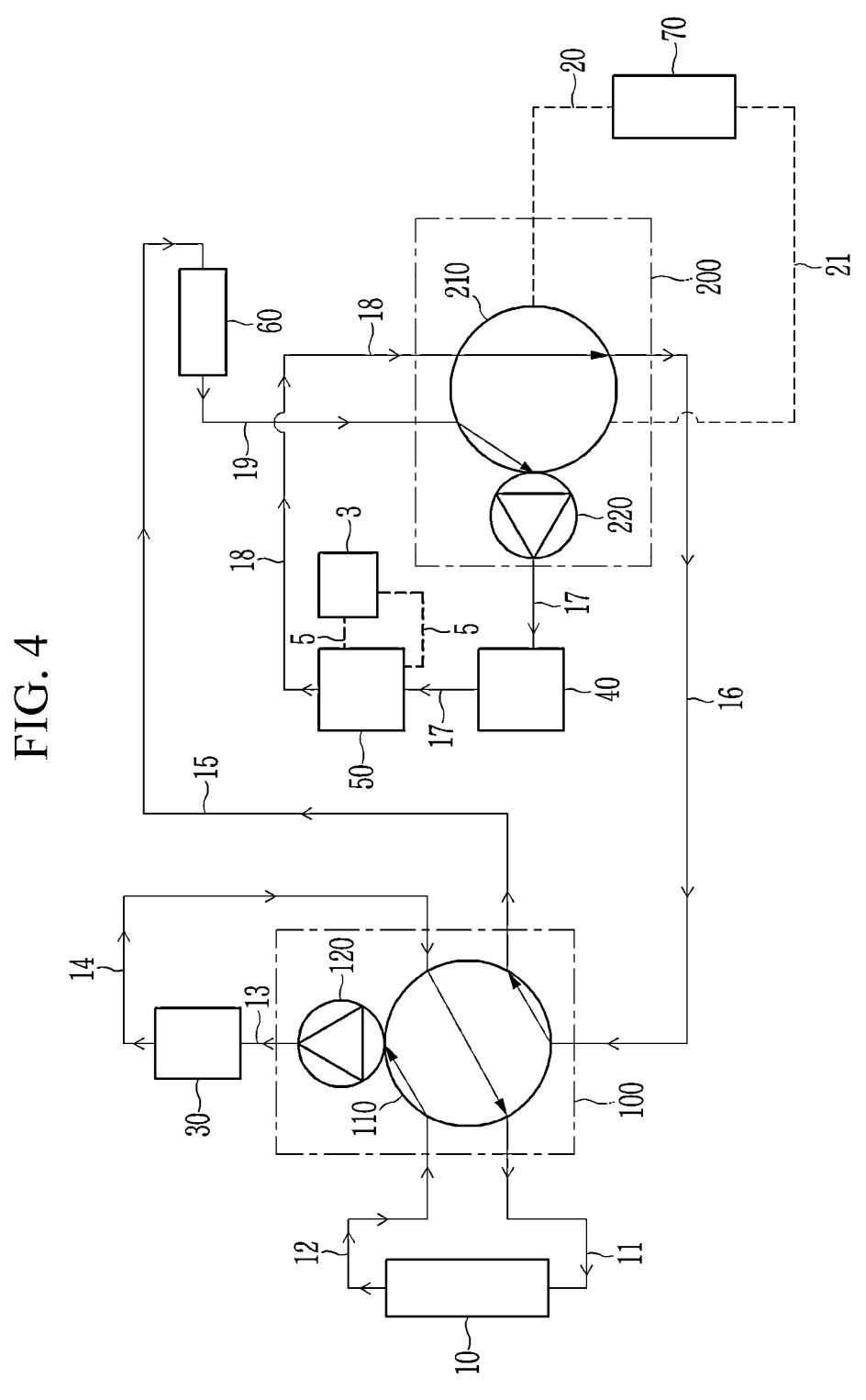
FIG. 4 is an operation diagram according to a third mode of a thermal management system for a vehicle according to an embodiment.

FIG. 4 is an operation diagram according to the third mode of a thermal management system for a vehicle according to an embodiment.

Referring to FIG. 4, in the third mode, the second line 12 may be connected to the third line 13 by the operation of the first valve 110 such that the coolant cooled at the radiator 10 may be supplied to the electrical component 30.

The fourth line 14 may be connected to the first line 11 by the operation of the first valve 110.

Accordingly, the first line 11, the second line 12, the third line 13, and the fourth line 14 may be interconnected by the operation of the first valve 110, so as to form an independent closed circuit through which the coolant circulates.

In such a state, when the first water pump 120 operates, the coolant discharged from the first valve 110 to the third line 13 may pass through the electrical component 30. Thereafter, the coolant may flow into the first valve 110 along the fourth line 14.

The coolant introduced into the first valve 110 through the fourth line 14 may be discharged to the first line 11 connected by the operation of the first valve 110.

The coolant discharged to the first line 11 may be introduced into the radiator 10. The coolant introduced into the radiator 10 may be cooled through heat-exchange with the ambient air. In addition, the coolant cooled at the radiator 10 may be introduced into the first valve 110 along the second line 12, and then discharged through the third line 13.

Therefore, the coolant cooled while passing through the radiator 10 may flow through the third line 13. Then, the electrical component 30 may be efficiently cooled by the coolant cooled at the radiator 10.

In other words, while repeatedly performing the above-described processes, the coolant cooled at the radiator 10 may cool the electrical component 30 to prevent overheating.

The sixth line 16 may be connected to the fifth line 15 by the operation of the first valve 110.

The ninth line 19 may be connected to the seventh line 17 by the operation of the second valve 210 such that the coolant heated by a battery heater 60 may be supplied to a battery module 40.

Simultaneously, the eighth line 18 may be connected to the sixth line 16 by the operation of the second valve 210. The tenth line 20 and the eleventh line 21 may be closed by the operation of the second valve 210.

Accordingly, the fifth line 15, the sixth line 16, the seventh line 17, the eighth line 18, and the ninth line 19 may be interconnected by the operation of the first valve 110 and the second valve 210, so as to form an independent closed circuit through which the coolant circulates.

The air conditioner unit 3 may not operate. Therefore, the refrigerant connection line 5 may be closed.

In such a state, when the second water pump 220 operates, the coolant having passed through the battery module 40 along the seventh line 17 from the second valve 210 may flow into the chiller 50, and then be discharged through the eighth line 18.

The coolant flowing along the eighth line 18 may flow into the sixth line 16 connected by the operation of the second valve 210.

The coolant flowing along the sixth line 16 may be introduced into the first valve 110. Thereafter, the coolant introduced into the first valve 110 may flow along the fifth line 15, and may pass through the battery heater 60.

The battery heater 60 may be operated to increase the temperature of the coolant by heating the introduced coolant. The coolant whose temperature is increased may flow into the second valve 210 along the ninth line 19. Thereafter, the coolant may be discharged to the seventh line 17 connected by the second valve 210, and may be supplied to the battery module 40.

As such, while repeatedly performing the above-described processes, the coolant whose temperature is increased at the battery heater 60 may increase the temperature of the battery module 40 more rapidly.

An operation in the fourth mode of the thermal management system, which is for heating the vehicle interior and increasing the temperature of the battery module 40, is described in detail below with reference to FIG. 5.

Figure 5:
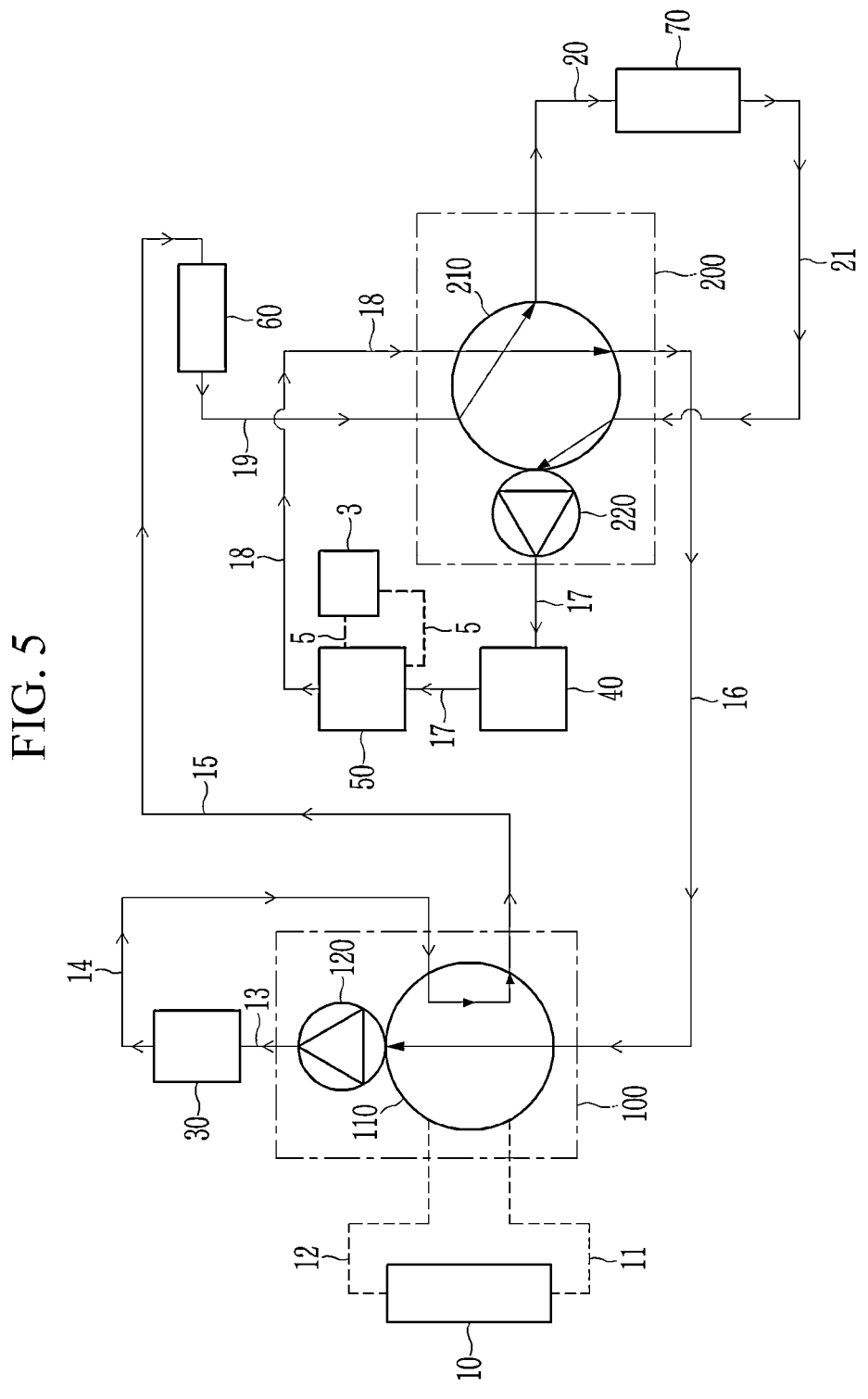
FIG. 5 is an operation diagram according to a fourth mode of a thermal management system for a vehicle according to an embodiment.

FIG. 5 is an operation diagram according to the fourth mode of a thermal management system for a vehicle according to an embodiment.

Referring to FIG. 5, in the fourth mode, the first line 11 and the second line 12 may be closed by the operation of the first valve 110. Accordingly, the coolant may not flow through the radiator 10.

The third line 13 may be connected to the sixth line 16 by the operation of the first valve 110. In addition, the fourth line 14 may be connected to the fifth line 15 by the operation of the first valve 110.

Simultaneously, the ninth line 19 may be connected to the tenth line 20 by the operation of the second valve 210 such that the coolant heated at the battery heater 60 may be supplied to the battery module 40 and the cabin heater 70.

In addition, the eleventh line 21 may be connected to the seventh line 17 by the operation of the second valve 210. The eighth line 18 may be connected to the sixth line 16 by the operation of the second valve 210.

Accordingly, the third line 13, the fourth line 14, the fifth line 15, the sixth line 16, the seventh line 17, the eighth line 18, the ninth line 19, the tenth line 20, and the eleventh line 21 may form one closed circuit through which the coolant circulates by the operation of the first valve module 100 and the second valve module 200.

In such a state, when the first water pump 120 and the second water pump 220 each operates, the coolant flowing from the first valve 110 through the third line 13 may pass through the electrical component 30, and may flow back into the first valve 110 along the fourth line 14.

Then, the coolant may pass through the battery heater 60 along the fifth line 15 connected to the fourth line 14 through the first valve 110.

The battery heater 60 may be operated to increase the temperature of the coolant by heating the introduced coolant. The coolant whose temperature is increased may be introduced into the second valve 210 along the ninth line 19, and then be discharged to the tenth line 20 connected by the second valve 210.

In other words, the coolant heated while passing through the battery heater 60 may be supplied first to the cabin heater 70, along the ninth line 19 and the tenth line 20 connected by the operation of the second valve module 200.

Accordingly, the ambient air introduced from the outside may be converted to a high-temperature state while passing through the cabin heater 70 and then introduced into the vehicle interior, thereby implementing heating of the vehicle interior.

The coolant having passed through the cabin heater 70 may flow into the second valve 210 along the eleventh line 21. Thereafter, the coolant may flow along the seventh line 17 connected to the eleventh line 21 through the second valve 210.

The coolant discharged from the second valve 210 to the seventh line 17 may sequentially pass through the battery module 40 and the chiller 50 along the seventh line 17. Thereafter, the coolant may flow back into the second valve 210 along the eighth line 18.

The air conditioner unit 3 may not operate. Therefore, the refrigerant connection line 5 may be closed.

The coolant introduced into the second valve 210 along the eighth line 18 may flow along the sixth line 16 connected to the eighth line 18 through the second valve 210.

The coolant flowing through the sixth line 16 may repeatedly perform the above-described processes while being discharged to the third line 13 connected through the first valve 110.

As such, while repeatedly performing the above-described processes, the coolant heated while passing through the battery heater 60 may first pass through the cabin heater 70 along the tenth line 20 connected to the ninth line 19 through the second valve module 200.

In other words, the high-temperature coolant heated at the battery heater 60 may first pass through the cabin heater 70, and accordingly, the vehicle interior may be more efficiently heated.

Then, while passing through the battery module 40 along the eleventh line 21 and the seventh line 17, the coolant having passed through the cabin heater 70 may heat the vehicle interior, and at the same time, may increase the temperature of the battery module 40.

In the present embodiment, an operation according to the fifth mode for cooling the battery module 40 by using the coolant cooled at the radiator 10 is described in detail below with reference to FIG. 6.

Figure 6:
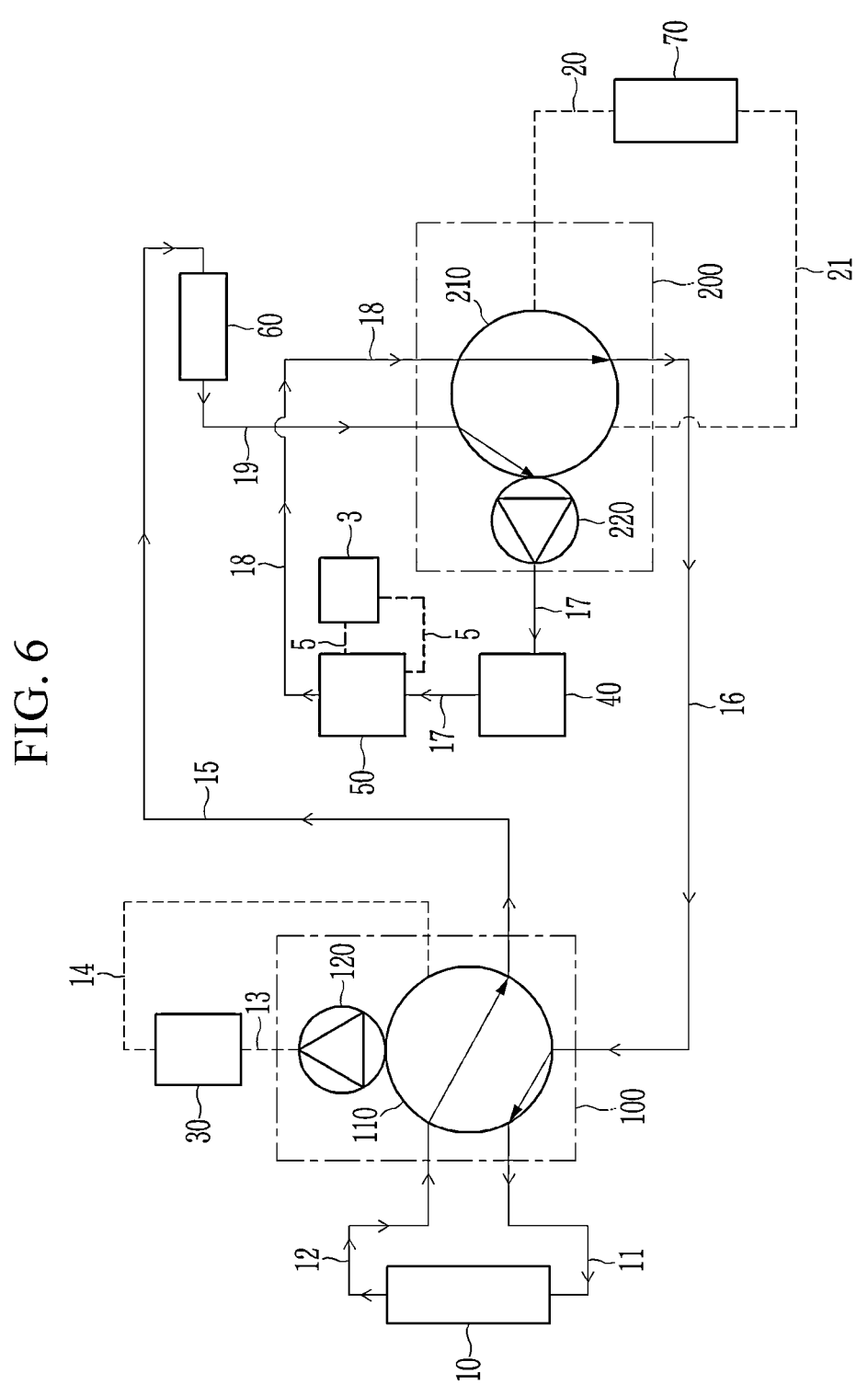
FIG. 6 is an operation diagram according to a fifth mode of a thermal management system for a vehicle according to an embodiment.

FIG. 6 is an operation diagram according to the fifth mode of a thermal management system for a vehicle according to an embodiment.

Referring to FIG. 6, the second line 12 may be connected to the fifth line 15 by the operation of the first valve 110 such that the coolant cooled at the radiator 10 may be supplied to the battery module 40.

Simultaneously, the sixth line 16 may be connected to the first line 11 by the operation of the first valve 110.

The third line 13 and the fourth line 14 may be closed by an operation of the first valve module 110.

The eighth line 18 may be connected to the sixth line 16 by the operation of the second valve 210. At the same time, the ninth line 19 may be connected to the seventh line 17 by the operation of the second valve 210.

The tenth line 20 and the eleventh line 21 may be closed by the operation of the second valve 210.

Accordingly, the first line 11, the second line 12, the fifth line 15, the sixth line 16, the seventh line 17, the eighth line 18, and the ninth line 19 may be interconnected by the operation of the first valve module 100 and the second valve module 200 so as to form an independent closed circuit through which the coolant circulates.

In such a state, when the second water pump 220 operates, the coolant having passed through the battery module 40 along the seventh line 17 may flow into the chiller 50, and then be discharged through the eighth line 18.

The air conditioner unit 3 may not operate. Therefore, the refrigerant connection line 5 may be closed.

The coolant flowing along the eighth line 18 may flow into the sixth line 16 connected by the operation of the second valve 210.

The coolant flowing along the sixth line 16 may be introduced into the first valve 110. Thereafter, the coolant introduced into the first valve 110 may be discharged to the first line 11.

The coolant discharged to the first line 11 may be introduced into the radiator 10. The coolant introduced into the radiator 10 may be cooled through heat-exchange with the ambient air. In addition, the coolant cooled at the radiator 10 may be introduced into the first valve 110 along the second line 12, and then discharged through the fifth line 15.

The coolant flowing along the fifth line 15 may pass through the battery heater 60, and then may flow along the ninth line 19. The battery heater 60 may not operate.

The coolant introduced into the second valve 210 through the ninth line 19 may be discharged to the seventh line 17 and may pass through the battery module 40.

According to such an operation, the coolant cooled while passing through the radiator 10 may flow through the seventh line 17. Then, the battery module 40 may be efficiently cooled by the coolant cooled at the radiator 10.

In more detail, the coolant cooled at the radiator 10 may be introduced directly into the battery module 40 without passing through the electrical component 30, and therefore, may more efficiently cool the battery module 40.

In other words, while repeatedly performing the above-described processes, the coolant cooled at the radiator 10 may cool the battery module 40 to prevent overheating.

Therefore, as described above, when a thermal management system for a vehicle according to an embodiment is applied, the temperature of the battery module 40 may be adjusted by using the battery heater 60 and the one chiller 50 where the refrigerant and the coolant are heat-exchanged, and heating of the vehicle interior may be performed by using the coolant heated at the battery heater 60, such that the overall efficiency of the system may be improved.

In addition, according to the present disclosure, a plurality of coolant flowing lines in the first and second valves 110 and 210 depending on the selected mode of the vehicle may be formed, such that streamlining and simplification of the system may be achieved, and the manufacturing costs may be reduced by removing the PTC heater.

In addition, according to an embodiment, by efficiently adjusting the temperature of the battery module 40, the optimal performance of the battery module 40 may be enabled, and the overall travel distance of the vehicle may be increased due to the efficient management of the battery module 40.

In addition, according to an embodiment, it is possible to reduce manufacturing cost and weight through simplification of an entire system, and to improve space utilization.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

3: air conditioner unit
5: refrigerant connection line
10: radiator
11, 12, 13: first, second, and third line
14, 15, 16: fourth, fifth, and sixth line
17, 18, 19: seventh, eighth, and ninth line
20, 21: tenth, and eleventh line
30: electrical component
40: battery module
50: chiller
60: battery heater
70: cabin heater
100: first valve module
110: first valve
120: first water pump
200: second valve module
210: second valve
220: second water pump

What is claimed is:

1. A thermal management system for a vehicle, the thermal management system comprising:
a first valve module configured to control flow of a coolant that is interiorly introduced according to at least one mode for a temperature adjustment of a vehicle interior, a temperature adjustment of an electrical component, and a temperature adjustment of a battery module; and
a second valve module selectively connected to the first valve module through at least one line, and configured to control flow of the interiorly introduced coolant according to the at least one mode,
wherein the at least one line selectively connects a radiator, the electrical component, the battery module, a chiller, a battery heater, and a cabin heater to the first valve module or the second valve module, and
wherein the at least one line comprises:
a first line having a first end connected to the first valve module to selectively allow flow of the coolant, and a second end connected to the radiator;
a second line having a first end connected to the radiator and a second end connected to the first valve module to selectively allow flow of the coolant;
a third line having a first end connected to the first valve module to selectively allow flow of the coolant, and a second end connected to the electrical component; and
a fourth line having a first end connected to the electrical component and a second end connected to the first valve module to selectively allow flow of the coolant.

2. The thermal management system of claim 1, wherein the at least one line further comprises:
a fifth line having a first end connected to the first valve module and a second end connected to the battery heater to selectively allow flow of the coolant;
a sixth line having a first end connected to the first valve module and a second end connected to the second valve module to selectively allow flow of the coolant;

a seventh line having a first end connected to the second valve module to selectively allow flow of the coolant and a second end connected to the chiller, and provided with the battery module;
an eighth line having a first end connected to the chiller and a second end connected to the second valve module, to selectively allow flow of the coolant;
a ninth line having a first end connected to the second valve module to selectively allow flow of the coolant, and a second end connected to the battery heater;
a tenth line having a first end connected to the second valve module to selectively allow flow of the coolant, and a second end connected to the cabin heater; and
an eleventh line having a first end connected to the cabin heater and a second end connected to the second valve module, to selectively allow flow of the coolant.

3. The thermal management system of claim 2, wherein the first valve module comprises:
a first valve configured to control flow of the interiorly introduced coolant; and
a first water pump provided in the first valve.

4. The thermal management system of claim 3, wherein the first valve is configured to selectively discharge the coolant selectively introduced from the second line, the fourth line, or the sixth line, through the first line, the third line, or the fifth line, depending on a selected mode among the at least one mode.

5. The thermal management system of claim 3, wherein the first water pump is mounted in the first valve to correspond to the third line.

6. The thermal management system of claim 2, wherein the second valve module comprises:
a second valve configured to control flow of the interiorly introduced coolant; and
a second water pump provided in the second valve.

7. The thermal management system of claim 6, wherein:
the second valve is configured to selectively discharge the coolant selectively introduced from the eighth line, the ninth line, or the eleventh line through the sixth line, the seventh line, or the tenth line.

8. The thermal management system of claim 6, wherein the second water pump is mounted in the second valve to correspond to the seventh line.

9. The thermal management system of claim 2, wherein the at least one mode comprises:
a first mode for cooling the electrical component and cooling the battery module;
a second mode for heating the vehicle interior and cooling the battery module;
a third mode for increasing a temperature of the battery module;
a fourth mode for heating the vehicle interior and increasing the temperature of the battery module; and
a fifth mode for cooling the battery module by using the coolant cooled at the radiator.

10. The thermal management system of claim 9, wherein, in the first mode:
the second line is connected to the third line by an operation of the first valve module, and the fourth line is connected to the first line by the operation of the first valve module such that the coolant cooled at the radiator is supplied to the electrical component;
the first line, the second line, the third line, and the fourth line are interconnected by the operation of the first valve module so as to form an independent closed circuit through which the coolant circulates;

the eighth line is connected to the seventh line by an operation of the second valve module to form an independent closed circuit through which the coolant circulates such that the coolant cooled at the chiller is supplied to the battery module;

the fifth line and the sixth line are closed by the operation of the first valve module; and the ninth line, the tenth line, and the eleventh line are closed by the operation of the second valve module.

11. The thermal management system of claim 9, wherein, in the second mode:

the first line and the second line are closed by an operation of the first valve module;

the third line is connected to the sixth line by the operation of the first valve module;

the fourth line is connected to the fifth line by the operation of the first valve module;

the eighth line is connected to the seventh line by an operation of the second valve module to form an independent closed circuit through which the coolant circulates such that the coolant cooled at the chiller is supplied to the battery module;

the ninth line is connected to the tenth line by the operation of the second valve module such that the coolant heated at the battery heater is supplied to the cabin heater;

the eleventh line is connected to the sixth line by the operation of the second valve module; and the third line, the fourth line, the fifth line, the sixth line, the ninth line, the tenth line, and the eleventh line are interconnected to the first valve module through the second valve module, so as to form an independent closed circuit through which the coolant circulates.

12. The thermal management system of claim 9, wherein, in the third mode:

the second line is connected to the third line by an operation of the first valve module, and the fourth line is connected to the first line by the operation of the first valve module such that the coolant cooled at the radiator is supplied to the electrical component;

the first line, the second line, the third line, and the fourth line are interconnected by the operation of the first valve module so as to form an independent closed circuit through which the coolant circulates;

the sixth line is connected to the fifth line by the operation of the first valve module;

the ninth line is connected to the seventh line by an operation of the second valve module such that the coolant heated at the battery heater is supplied to the battery module;

the eighth line is connected to the sixth line by the operation of the second valve module;

the tenth line and the eleventh line are closed by the operation of the second valve module; and the fifth line, the sixth line, the seventh line, the eighth line, and the ninth line are interconnected by the operation of the first valve module and the second valve module, so as to form an independent closed circuit through which the coolant circulates.

13. The thermal management system of claim 9, wherein, in the fourth mode:

the first line and the second line are closed by an operation of the first valve module;

the third line is connected to the sixth line by the operation of the first valve module;

the fourth line is connected to the fifth line by the operation of the first valve module;

the ninth line is connected to the tenth line by an operation of the second valve module such that the coolant heated at the battery heater is supplied to the battery module and the cabin heater;

the eleventh line is connected to the seventh line by the operation of the second valve module;

the eighth line is connected to the sixth line by the operation of the second valve module; and the coolant heated while passing through the battery heater passes through the cabin heater along the tenth line connected to the ninth line through the second valve module, and then passes through the battery module along the eleventh line and the seventh line connected by the second valve module.

14. The thermal management system of claim 9, wherein, in the fifth mode:

the second line is connected to the fifth line by an operation of the first valve module such that the coolant cooled at the radiator is supplied to the battery module;

the sixth line is connected to the first line by the operation of the first valve module;

the third line and the fourth line are closed by the operation of the first valve module;

the eighth line is connected to the sixth line by an operation of the second valve module;

the ninth line is connected to the seventh line by the operation of the second valve module;

the tenth line and the eleventh line are closed by the operation of the second valve module; and the first line, the second line, the fifth line, the sixth line, the seventh line, the eighth line, and the ninth line are interconnected by the operation of the first valve module and the second valve module, so as to form an independent closed circuit through which the coolant circulates.

15. The thermal management system of claim 1, wherein the chiller is connected to an air conditioner unit through a refrigerant connection line.

16. The thermal management system of claim 15, wherein the chiller is a water-cooled heat-exchanger configured to heat-exchange the interiorly introduced coolant with the refrigerant supplied from the air conditioner unit.

17. The thermal management system of claim 15, wherein, for cooling the battery module by using the coolant heat-exchanged at the chiller, the air conditioner unit is configured to supply a refrigerant of low-temperature to the chiller through the refrigerant connection line.

* * * * *